B. F. MERTZ.
TRACTION GANG PLOW.
APPLICATION FILED FEB. 5, 1917.
1,256,349.
Patented Feb. 12, 1918.
4 SHEETS—SHEET 1.
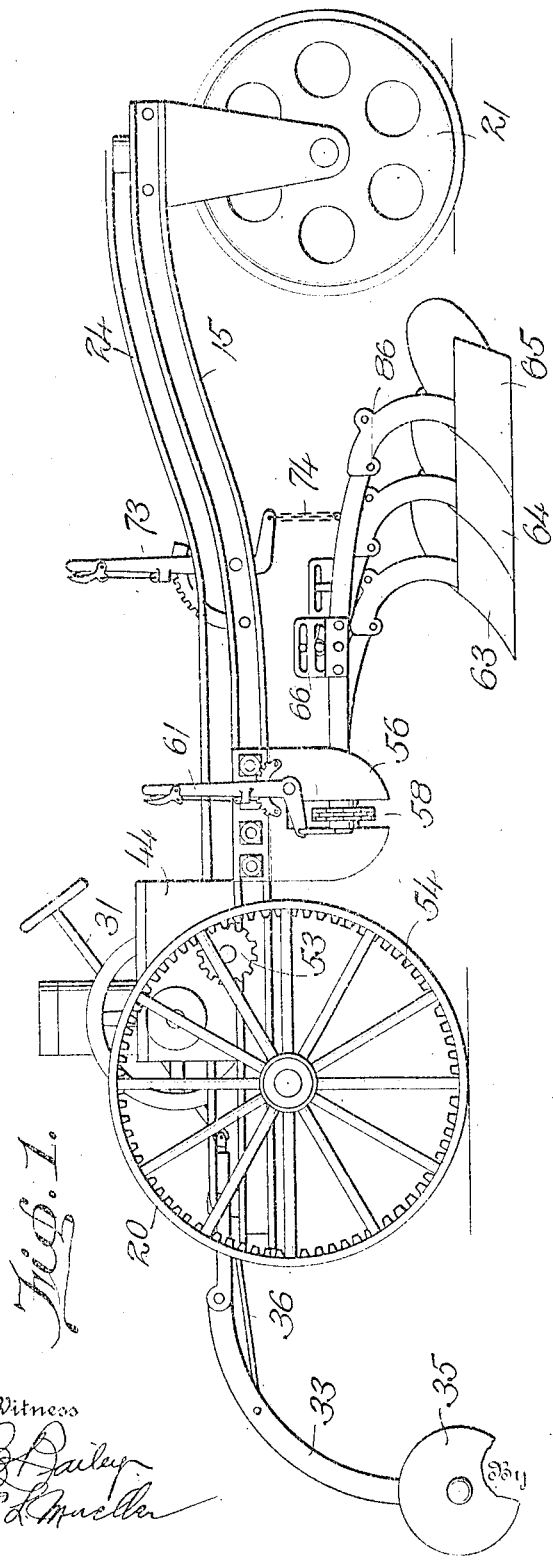
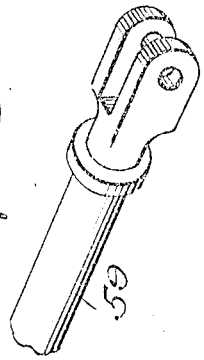
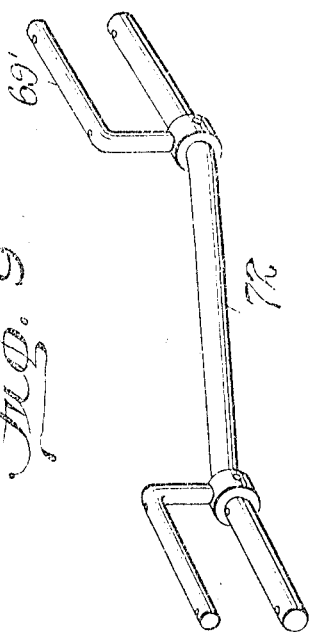

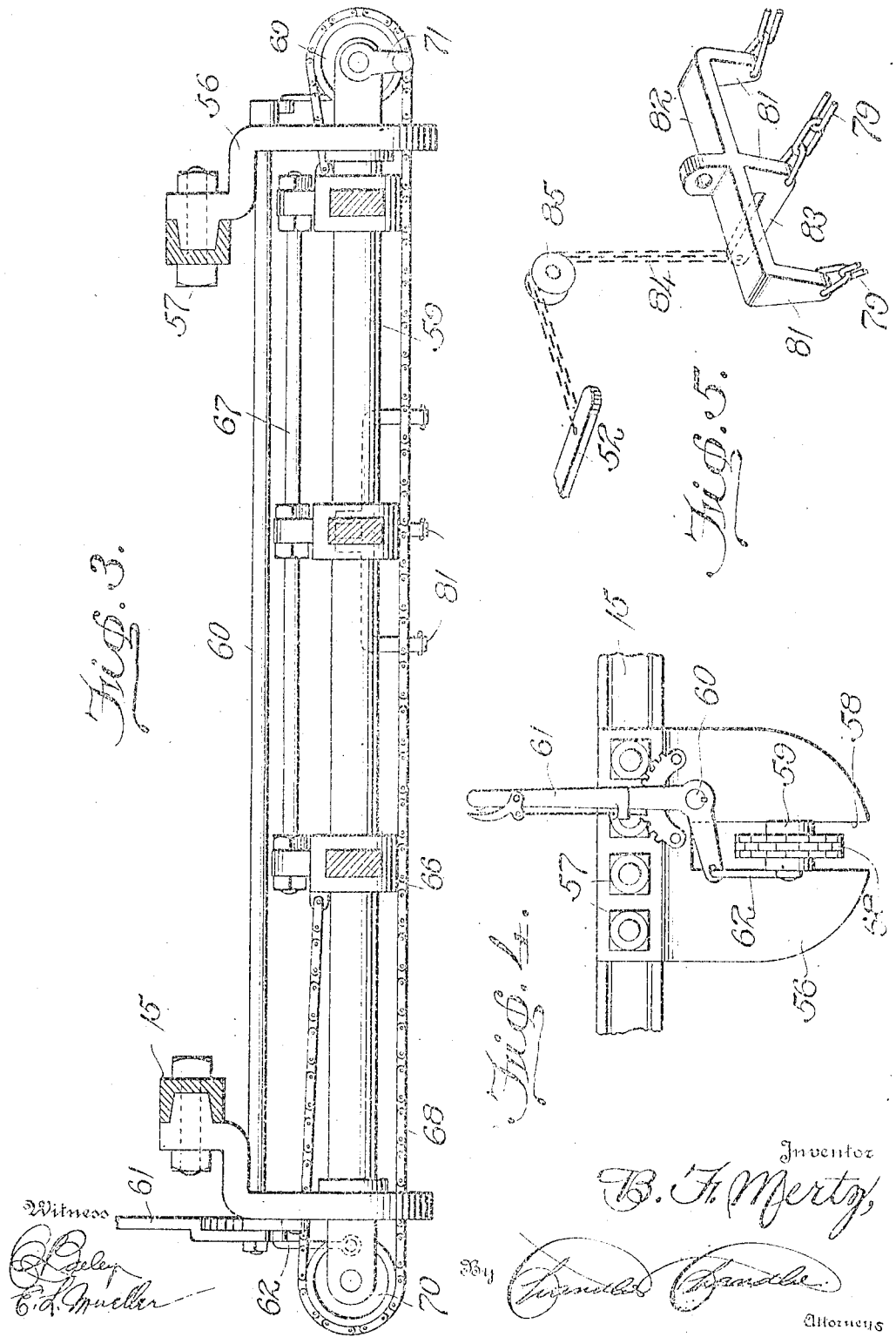

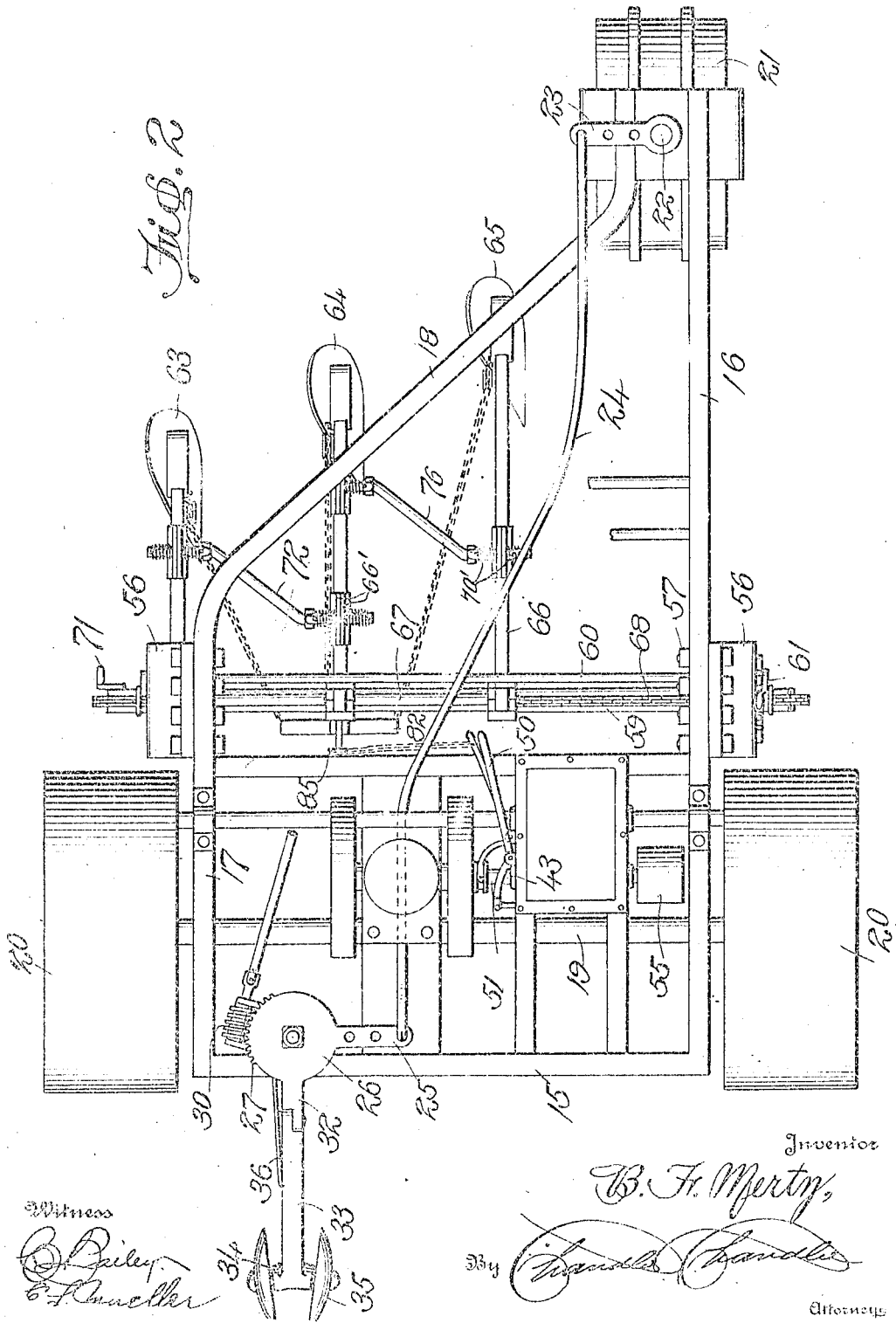

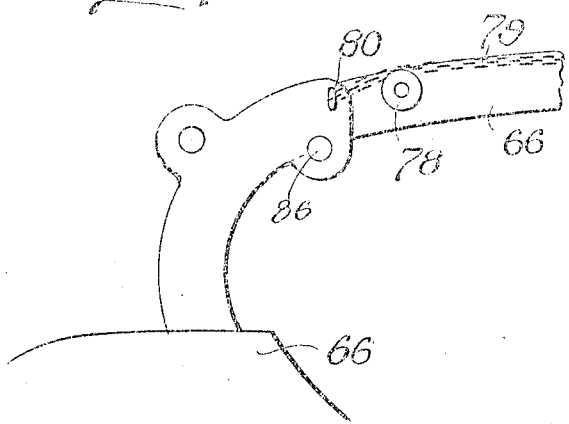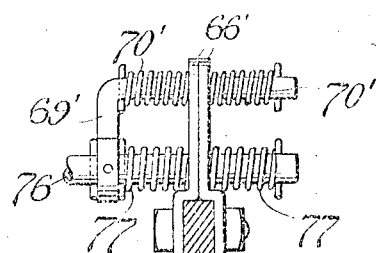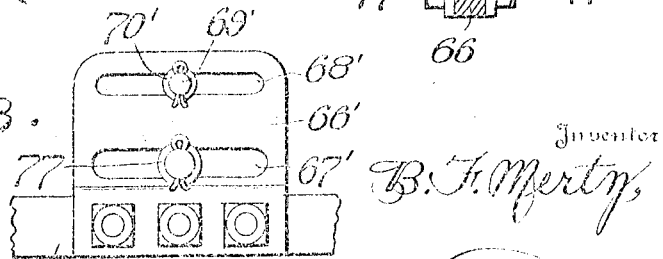

UNITED STATES PATENT OFFICE.

BOYD F. MERTZ, OF NORTHUMBERLAND, PENNSYLVANIA.

TRACTION GANG-PLOW.

1,256,349.

Specification of Letters Patent. Patented Feb. 12, 1918.

Application filed February 5, 1917. Serial No. 146,768.

*To all whom it may concern:*

Be it known that I, BOYD F. MERTZ, a citizen of the United States, residing at Northumberland, in the county of Northumberland, State of Pennsylvania, have invented certain new and useful Improvements in Traction Gang-Plows; and I do hereby declare the following to be a full, clear, and exact description of the invention, such as will enable others skilled in the art to which it appertains to make and use the same.

This invention is an improvement in agricultural machines and has particular reference to a gang plow for tractors.

An object of the invention is the provision of a construction whereby a plurality of plows may be attached to the tractor frame and readily detached therefrom whereby the tractor may be employed for other purposes.

Another object is to provide for the lateral adjustment of the plows relative to the tractor frame in order that the plows may be shifted to any desired position, and for this purpose, there is provided a draw bar upon which the plow beams are slidable, said beams having connected thereto a flexible element operable to shift said beams and their plows from one side of the frame toward the other.

The inventive idea involved is capable of receiving a variety of mechanical expressions, some of which for the purpose of illustrating the present invention, are shown in the accompanying drawings, wherein:—

Figure 1 is a side elevation of the machine constructed in accordance with the invention.

Fig. 2 is a top plan view thereof.

Fig. 3 is a transverse section taken through the center portion of the machine and showing the mechanism for shifting the plows from one side of the frame to the other.

Fig. 4 is an enlarged side elevation of the means for attaching the plows to the tractor frame and also the means for vertically adjusting the plow points.

Fig. 5 is a detail perspective view of the means for operating the clutch of the engine to stop the machine.

Fig. 6 is an enlarged detail side elevation of one of the plows showing the means attached thereto for operating the device illustrated in Fig. 5.

Fig. 7 is an enlarged detail view of the means for yieldingly retaining the plows in an adjusted or centered position.

Fig. 8 is a view taken at right angles to Fig. 7.

Fig. 9 is a detail perspective of one of the crank members for connecting the adjacent plows.

Fig. 10 is a similar view of one end of the draw bar for supporting the forward ends of the plow beams.

Referring more particularly to the accompanying drawings in which like characters indicate similar parts, the numeral 15 indicates the frame of the tractor which includes the side members 16 and 17, the latter being curved at its rear end as indicated at 18 so that the rear ends of said side members will be arranged in converging relation. The forward end of the frame 15 is provided with the usual axle 19 upon the ends of which are mounted the tractor wheels 20 and supported by the rear ends of the side members 16 and 17 of the frame is the ground engaging steering wheel 21. This wheel 21 carries a post 22 to the upper end of which is connected an arm 23. A rod 24 which forms a portion of the steering connections has its rear end secured to the arm 23 and its forward end secured to an extension 25 of a rotatably mounted direction controlling member 26 in the form of a substantially circular plate having the teeth 27 upon a portion of its periphery. A worm gear 30 is adapted to mesh with the teeth 27 when it is desired to steer the tractor manually by means of the usual steering shaft 31 which has said gear 30 upon its lower end. The member 26 has projecting from its periphery a forwardly extending arm 32 to the front end of which is pivotally connected a beam 33 which extends forwardly of the arm 15 and has its forward end curved downwardly and provided with a bearing 34 in which are mounted the opposed furrow engaging disks 35 which are adapted to engage a previously made furrow in order to cause the entire machine to follow the path of said furrow and thus automatically guide said machine, at which time the use of the steering shaft 31 is dispensed with.

The tractor frame 15 has the drive shaft 43 mounted therein and connected to any suitable source of power such as a gasolene motor, said shaft extending through a gear casing 44 which is adapted to contain a lubricant whereby the several gears in the casing may be properly lubricated. The gearing (not shown) in said casing is controlled by a lever 50 pivoted to said casing, and associated with the drive shaft 43 is a clutch 51 operated by a lever 52 to control the operation of said shaft whereby power may be applied to the gears 53 which mesh with the gears 54 of the tractor wheels 20. A pulley 55 is mounted upon the drive shaft 43 exteriorly of the casing 44 and may be employed in operating any mechanism not shown in the drawings.

The manner of attaching several plows to the tractor frame preferably comprises a supporting member 56, in the form of a plate, secured to each side of the frame 15 intermediate the ends thereof, by means of bolts 57 which permit of the removal of said plates from the frame when it is desired to use the tractor alone. These plates are provided with vertical slots 58 in which the transverse draw bar 59 is mounted. A pivot rod 60 connects the two plates 56 and has mounted thereon a lever 61 having a connection 62 with the draw bar 59 and said lever is adjustable to raise and lower said draw bar whereby the points of the plows connected thereto may be vertically adjusted.

The several plows 63, 64 and 65 are of any preferred construction and have the forward end of their beams 66 slidably engaged upon the draw bar 59 so that said plows may be shifted to either side of the frame in a manner to be presently described. Connecting the forward ends of said beams is a rod 67 which at all times maintains the beam in proper spaced relation. The means for adjusting the several plows transversely of the frame preferably comprises a flexible element 68 in the form of a chain secured at one end to the beam of one of the outside plows 63 and extending longitudinally of the draw bar to the end thereof where said chain passes over a sprocket wheel 69 carried by said end of the draw bar from whence said chain passes beneath the draw bar to the other end thereof where it is mounted over another sprocket 70 and then secured at its other end to the beam of the other outside plow 65. Any suitable means, such as a crank 71, may be employed for rotating the sprocket wheels 69 and 70 to secure the adjustment desired.

The plow beams of the plows 63 and 64 are connected by a crank member 72 which permits of an independent vertical adjustment of each plow through the medium of the usual lever 73 having a connection 74 with its respective plow. Mounted upon each end of the crank member 72 and on each side of the adjacent plow beam are coil springs 75, which yieldably maintain the plows in the position shown but which permit of a slight independent lateral movement of either plow should the same strike an obstruction without sufficient force to break the usual break pin of the plow. The plow beams of the plows 64 and 65 are likewise connected by a crank member 76 similar in construction to the crank 72 and having the coil springs 77 mounted upon each end thereof. Each plow beam 66 has also secured thereto the plates 66' having the slots 67' and 68' therein. An end of the adjacent crank member is mounted in the registered slots 67' of the plates while an end of an angular arm 69' is mounted in the slots 68' of each plate, the other end of said arm having an opening through which passes the adjacent portion of said crank member. Springs 70' are coiled about the angle arms 69' on each side of the plates 60' and said arms and springs also aid in maintaining the plows in their proper positions.

Means are provided in connection with the plow for automatically operating the clutch lever 52 to stop the travel of the machine should any one of the plows strike an obstruction with sufficient force to break the break pin, and this means preferably includes a small pulley 78 mounted upon the rear end of each plow beam and over which passes a flexible element 79, such as a chain, one end of which is secured to the plow at 80 while the forward end of said chain is connected to one of the arms 81 of a pivoted member 82 which also has extending laterally therefrom another arm 83 the forward end of which is connected to a chain or other flexible element 84 which passes over a pulley 85 and is connected to the clutch lever 52. It will be apparent that when the break pin 86 of any one of the plows is broken, said plow will swing about its pivot and draw the flexible element 79 rearwardly which will swing the member 82 about its pivot in a similar direction and operate the chain 84 to exert a pull upon the clutch lever 52 and thus discontinue the operation of the driving mechanism until said lever is again actuated to throw the clutch into clutching engagement.

What is claimed is:—

1. In a gang plow, the combination of a frame, a draw bar adjustable relative thereto, a plurality of plows adjustable longitudinally of said draw bar, a flexible element connecting certain of said plows, and means operatively connected to said elements for actuating the same to adjust said plows.

2. In a gang plow, the combination of a frame, supporting members detachably secured to the sides thereof, a draw bar mounted in said supporting members and vertically adjustable therein, a plurality of plows slidable longitudinally of said draw bar, a flexible element connecting certain of said plows, and means operatively connected to said element for actuating the same to slide said plows on said draw bar.

3. In a gang plow, the combination of a frame, supporting members detachably secured to the sides thereof, a draw bar mounted in said supporting members and vertically adjustable therein, a plurality of plows slidable longitudinally of said draw bar, a flexible element connecting certain of said plows, and means operatively connected to said element for actuating the same to slide said plows on said draw bar, and means connecting said plows for maintaining same equidistances apart.

4. In a gang plow, the combination of a frame, supporting members detachably secured to the sides thereof, a draw bar mounted in said supporting members and vertically adjustable therein, a plurality of plows connected to said draw bar, cranks extending between certain of said plows, and means for independently operating each plow.

5. In a gang plow, the combination of a frame, supporting members detachably secured to the sides thereof, a draw bar mounted in said supporting members and vertically adjustable therein, a plurality of plows connected to said draw bar, cranks extending between certain of said plows, means for independently operating each plow, and resilient means carried by each crank and engaging the adjacent plow for yieldably resisting lateral movement of the plow.

In testimony whereof, I affix my signature, in the presence of two witnesses.

BOYD F. MERTZ.

Witnesses:
 HAROLD R. MERTZ,
 W. H. MERTZ.